United States Patent
Hay

(10) Patent No.: US 6,580,390 B1
(45) Date of Patent: Jun. 17, 2003

(54) METHOD AND SYSTEM FOR GLOBAL POSITIONING SYSTEM MASK ANGLE OPTIMIZATION

(75) Inventor: Curtis L. Hay, Clarkston, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/158,288

(22) Filed: May 30, 2002

(51) Int. Cl.[7] ............................................... H04B 7/185
(52) U.S. Cl. .......................... 342/357.15; 342/357.06; 342/357.1
(58) Field of Search ........................ 342/357.15, 357.1, 342/357.06

(56) References Cited

U.S. PATENT DOCUMENTS

| | | | | |
|---|---|---|---|---|
| 4,949,268 A | * | 8/1990 | Nishikawa et al. | 342/357.15 |
| 6,147,644 A | * | 11/2000 | Castles et al. | 342/357.09 |
| 6,157,896 A | * | 12/2000 | Castles et al. | 342/357.06 |
| 6,313,786 B1 | * | 11/2001 | Sheynblat et al. | 342/357.02 |
| 6,324,474 B1 | * | 11/2001 | Beisner et al. | 342/357.06 |
| 6,377,891 B1 | * | 4/2002 | Gilbert | 342/357.06 |
| 6,430,504 B1 | * | 8/2002 | Gilbert et al. | 342/357.12 |

OTHER PUBLICATIONS

GPS antenna selection and placement for optimum automotive performance, Y. Dai et al., 2001 IEEE International Symposium of the Antennas and Propagation Society, vol. 1, p. 132–135, 2001.*

* cited by examiner

Primary Examiner—Thomas H. Tarcza
Assistant Examiner—Fred H Mull
(74) Attorney, Agent, or Firm—Anthony Luke Simon

(57) ABSTRACT

The invention provides a method for global positioning system mask angle optimization by identifying a mobile communication unit, providing a global positioning system receiver antenna to be in communication with the mobile communication unit, determining at least one global positioning system characteristic as a function of the mobile communication unit and the global positioning system receiver antenna, and determining an optimal mask angle as a function of the global positioning system characteristic.

15 Claims, 3 Drawing Sheets

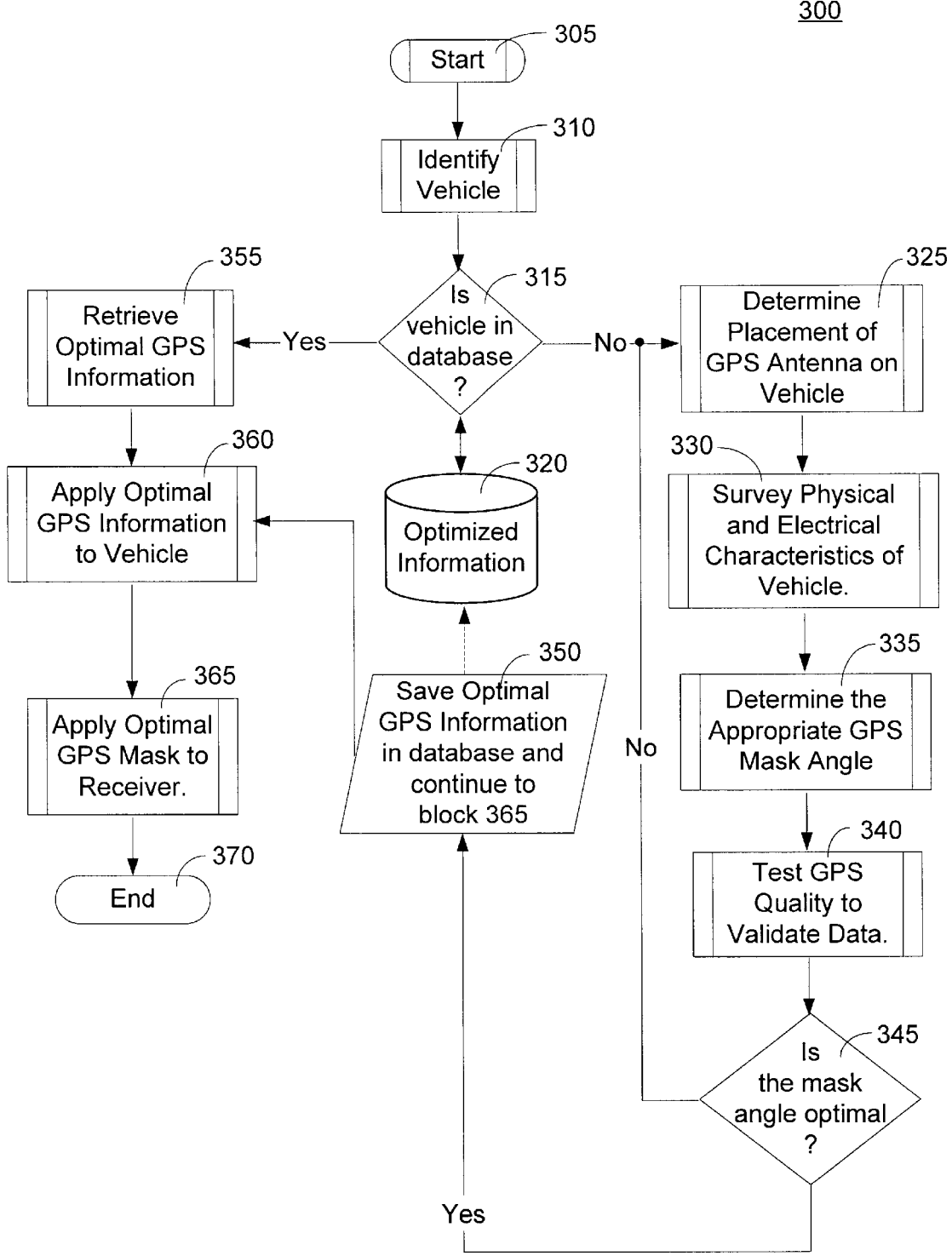

METHOD AND SYSTEM FOR GLOBAL POSITIONING SYSTEM MASK ANGLE OPTIMIZATION

FIELD OF THE INVENTION

In general, the invention relates to satellite enabling navigation in terrestrial environments prone to signal reflection (multipath). More specifically, the invention relates to a method and system for optimizing a mask angle for global positioning system receivers.

BACKGROUND OF THE INVENTION

The Global Positioning System (GPS) receiver concept is based on the reception of satellite signals that can be used to determine precise location, speed, and time. A number of factors heavily influence the accuracy and performance of a GPS receiver. These include for example, atmospheric effects, unwanted signal reflections (multipath), sky obstructions, and satellite geometry. To minimize the effects of the error sources, GPS receivers are often programmed with a specific "mask angle." This parameter defines the minimum elevation below which satellite signals will not be used. Different receiver applications require different mask angles. For example, open-air surveying with precision GPS equipment on elevated terrain may be accurately accomplished with smaller mask angles. Aircraft, weapon, and vehicle navigation is more suited to higher mask angles in order to reduce the effects of unwanted signal reflections (multi-path) off of metallic surfaces. GPS accuracy for a spacecraft is strongly affected by the effect of multi-path on the spacecraft structure.

Typically, GPS receivers that have been designed for a particular application (for example surveying, precise time determination, or automotive navigation) are programmed with a default and fixed mask angle, unable to vary between platforms. The default mask angle for receivers is often between 5 and 15 degrees.

There are many drawbacks to low mask angle values. Low-elevation ranging measurements are more heavily affected by ionospheric and tropospheric refraction, multipath effects are much more noticeable, and horizontal obstructions can prevent reception. However, higher values reduce the receiver's visibility to important regions of the sky. Low elevation measurements often improve accuracy by reducing dilution of precision.

Thus, there is a significant need for a method and system for optimizing the mask angle technology used in Global Positioning Systems, which overcome the above constraints, as well as other disadvantages.

SUMMARY OF THE INVENTION

One aspect of the invention provides a method for global positioning system mask angle optimization involving a reading a first entry of a mobile communication unit optimized database, the first entry indicative of a first optimal mask angle corresponding to a first placement location of a global positioning system antenna on a mobile communication unit. Next, the global positioning system antenna is operationally installed on a first placement location of the mobile communication unit in accordance with the first entry, and the first optimal mask angle is applied to a global positioning system receiver in accordance with the first entry.

Another aspect of the invention presents a system for a global positioning system mask angle optimization by providing means for reading a first entry of a mobile communication unit optimized database, the first entry indicative of a first optimal mask angle corresponding to a first placement location of a global positioning system antenna on a mobile communication unit. The system further includes means for instructing an operational installation of the global positioning system antenna on the first placement location of the mobile communication unit in accordance with the first entry, and means for instructing an application of the first optimal mask angle to a global positioning system receiver in accordance with the first entry.

Another aspect of the invention provides a computer readable medium for storing a computer program for providing a method for global positioning system mask angle optimization. The computer program is comprised of computer readable code for reading a first entry of a mobile communication unit optimized database, the first entry indicative of a first optimal mask angle corresponding to a first placement location of a global positioning system antenna on a mobile communication unit. The computer readable medium further includes computer readable code for instructing an operational installation of the global positioning system antenna on the first placement location of the mobile communication unit in accordance with the first entry, and computer readable code for instructing an application of the first optimal mask angle to a global positioning system receiver in accordance with the first entry.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 3 is a flow chart representation for one embodiment of a Global Positioning System mask angle optimization method suitable for use in the systems of FIG. 1 and FIG. 2, in accordance with the present invention.

DETAILED DESCRIPTION OF A PREFERRED EMBODIMENT

Figure 1:
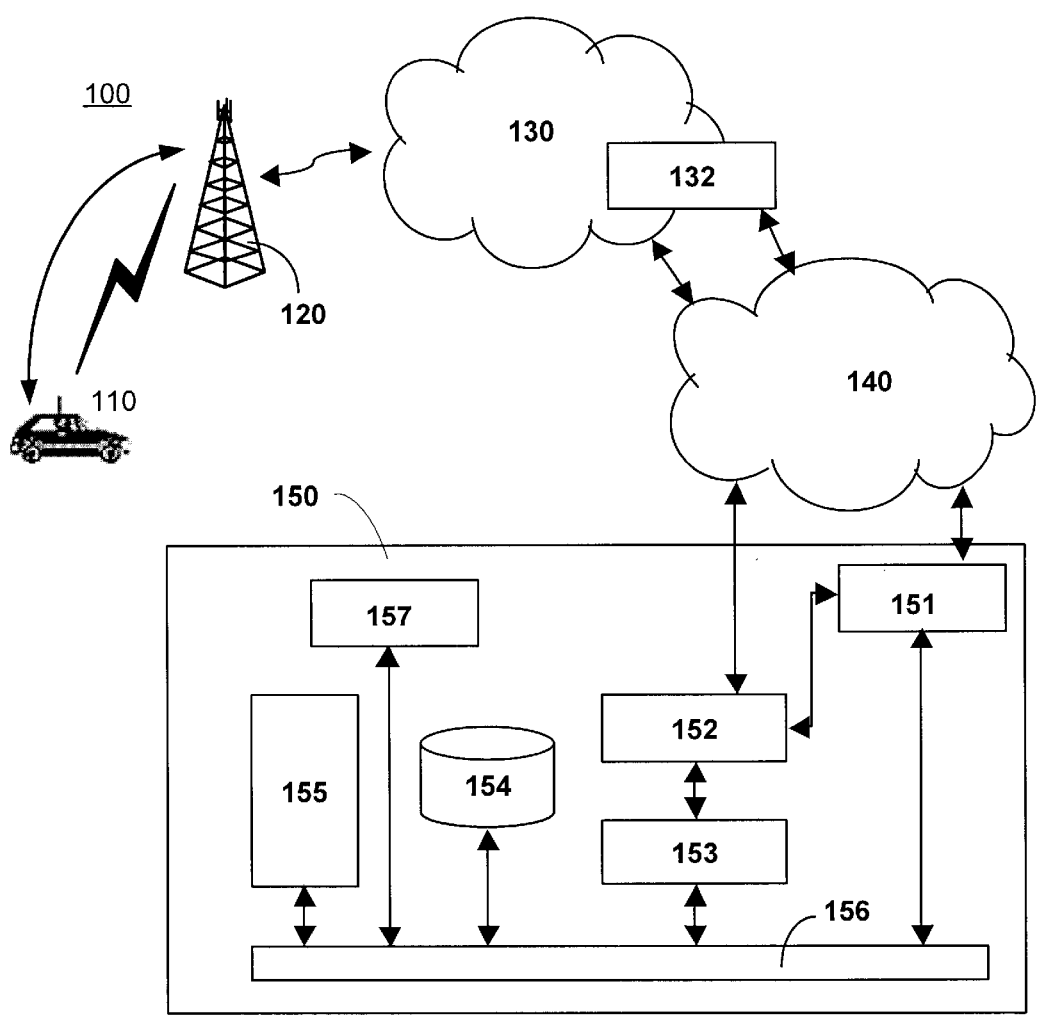
FIG. 1 is a schematic diagram for one embodiment of a system for communication with a mobile communication unit using a wireless communication system, in accordance with the present invention.

FIG. 1 shows an illustration for one embodiment of a system for communicating with a mobile communication unit using a wireless communication system in accordance with the present invention, and may be referred to as a mobile communication unit communication system (MVCS) 100, and in one embodiment may include the OnStar System as is known in the art. The mobile communication unit communication system 100 may contain one or more mobile communication units 110, one or more wireless carrier systems 120, one or more communication networks 130, one or more short message service centers 132, one or more land networks 140, and one or more call centers 150. Additionally, for one embodiment of the invention the mobile communication units 110 may be a portable unit, an automobile (vehicle), an aircraft, and a spacecraft. The portable unit may be for example, a movable transit, or a hand held global positioning system (GPS) device, or other known item that may benefit from the use of communications, as is described throughout this detailed description.

Call center 150 may contain one or more switches 151, one or more data transmission devices 152, one or more communication services managers 153, one or more communication services databases 154, one or more advisors 155, one or more bus systems 156, and one or more automated speech recognition (ASR) units 157.

Mobile communication unit 110 may contain a wireless vehicle communication device (module, MVCS module) such as an analog or digital phone with suitable hardware and software for transmitting and receiving data communications. Mobile communication unit 110 may contain a wireless modem for transmitting and receiving data. Mobile communication unit 110 may contain a digital signal processor with software and additional hardware to enable communications with the mobile communication unit and to perform other routines and requested services. Mobile communication unit 110 may contain a global positioning system (GPS) unit capable of determining synchronized time and a geophysical location of the mobile communication unit. Mobile communication unit 110 may send to and receive radio transmissions from wireless carrier system 120. Mobile communication unit 110 may contain a speech recognition system (ASR) capable of communicating with the wireless vehicle communication device. The module may additionally be capable of functioning as any part or all of the above communication devices and, for one embodiment of the invention, may be capable of data storage, and/or data retrieval, and/or receiving, processing, and transmitting data queries.

Wireless carrier system 120 may be a wireless communications carrier or a mobile telephone system. The mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications. Wireless carrier system 120 may transmit to and receive signals from mobile communication unit 110. Wireless carrier system 120 may transmit to and receive signals from a second mobile communication unit 110. Wireless carrier system 120 may be connected with communications network 130.

Communications network 130 may comprise a mobile switching center. Communications network 130 may comprise services from one or more wireless communications companies. Communications network 130 may be any suitable system or collection of systems for connecting wireless carrier system 120 to at least one mobile communication unit 110 or to a call center.

Communications network 130 may include one or more short message service centers 132. Short message service center 132 may prescribe alphanumeric short messages to and from mobile communication units 110. Short message service center 132 may include message entry features, administrative controls, and message transmission capabilities. For one embodiment of the invention, the short message service center 132 may include one or more automated speech recognition (ASR) units. Short message service center 132 may store and buffer the messages. Short message services may include functional services such as paging, text messaging and message waiting notification. Short message services may include other telematic services such as broadcast services, time-driven message delivery, autonomous message delivery, and database-driven information services. The telematic services may further include message management features, such as message priority levels, service categories, expiration dates, cancellations, and status checks.

Land network 140 may be a public-switched telephone network. Land network 140 may be comprised of a wired network, an optical network, a fiber network, another wireless network, or any combination thereof. Land network 140 may comprise an Internet protocol (IP) network. Land network 140 may connect communications network 130 to a call center. In one embodiment of the invention, a communication system may reference all or part of the wireless carrier system 120, communications network 130, land network 140, and short message service center 132.

Land network 140 may connect a first wireless carrier system 120 with a second wireless carrier system 120. Communication network 130 and land network 140 may connect wireless carrier system 120 to a communication node or call center 150.

Call center 150 may be a location where many calls can be received and serviced at the same time, or where many calls may be sent at the same time. The call center may be a telematic call center, prescribing communications to and from mobile communication units 110. The call center may be a voice call center, providing verbal communications between an advisor in the call center and a subscriber in a mobile communication unit. The call center may be a voice activated call center, providing verbal communications between an ASR unit and a subscriber in a mobile communication unit. The call center may contain any of the previously described functions.

The call center may contain switch 151. Switch 151 may be connected to land network 140, and may receive a modem signal from an analog modem or from a digital modem. Switch 151 may transmit voice or data transmission from the communication node. Switch 151 may also receive voice or data transmissions from mobile communication unit 110 through wireless carrier system 120, communications network 130, and land network 140. Switch 151 may receive from or send data transmissions to data transmission device 152. Switch 151 may receive from or send voice transmissions to advisor 155 via bus system 156. Switch 151 may receive from or send voice transmissions to one or more automated speech recognition (ASR) units 157 via bus system 156.

Data transmission device 152 may send or receive data from switch 151. Data transmission device 152 may be an IP router or a modem. Data transmission device 152 may transfer data to or from advisor 155, one or more communication services managers 153, one or more communication services databases 154, one or more automated speech recognition (ASR) units 157, and any other device connected to bus system 156. Data transmission device 152 may convey information received from short message service center 132 in communication network 130 to communication services manager 153.

Communication services manager 153 may be connected to switch 151, data transmission device 152, and advisor 155 through bus system 156. The call center may contain any combination of hardware or software facilitating data transmissions between call center 150 and mobile communication unit 110.

Communication services manager 153 may receive information from mobile communication unit 110 through wireless carrier system 120, short message service center 132 in communication network 130, land network 140, and data transmission device 152. Communication services manager 153 may send information to mobile communication unit 110 through data transmission device 152, land network 140, communication network 130 and wireless carrier system 120. Communication services manager 153 may send short message service messages via short message service center 132 to the mobile communication unit. Communication services manager 153 may receive short message service replies from mobile communication unit 110 via short message service center 132. Communication services manager 153 may send a short message service request to mobile communication unit 110. Communication services manager 153 may receive from or send voice transmissions to one or more automated speech recognition (ASR) units 157.

In another embodiment of the invention, short message service (SMS) communications may be sent and received according to established protocols such as IS-637 standards for SMS, IS-136 air interface standards for SMS, and GSM 03.40 and 09.02 standards. These protocols allow for example, short messages comprised of up to 160 alphanumeric characters and may contain no images or graphics. Similar to paging, an SMS communication may be posted along with an intended recipient, such as a communication device in mobile communication unit 110. The SMS communication may be sent by a communication services manager in a call center, transferred to a short message service center (SMSC), and conveyed to the intended recipient. In one embodiment of the invention, mobile communication unit 110 may receive an SMS message when the ignition is on, or when put into an SMS-ready or service-ready mode while the ignition is off. The mobile communication unit 110 may be placed in a powered down or quiescent mode while the ignition is off. When the mobile communication unit is placed into a service ready mode, the phone in the mobile communication unit may register with a local wireless carrier if needed, or with the subscriber's home system if the mobile communication unit is not roaming. If an SMS message is waiting to be sent, the wireless carrier may deliver the message and the mobile phone may acknowledge receipt of the message by an acknowledgment to the SMSC. Mobile communication unit 110 may perform an operation in response to the SMS message, and may send an SMS reply message back to the call center. Similarly, another embodiment of the mobile communication unit 110 may originate an SMS message to the call center through the SMSC.

In one embodiment of the invention, the communication services manager 153 may determine whether an SMS communication should be sent to mobile communication unit 110. An SMS message may be initiated in response to a subscriber request, such as a request to unlock the vehicle doors. An SMS message may be sent automatically, for example, when an update or vehicle preset value is desired or when a diagnostic message is needed. In another embodiment of the invention, a SMS message may be sent to periodically check the location and status of mobile communication unit 110, and for another embodiment of the invention, to request data collection, data retrieval, and/or data submission from mobile communication unit 110. In yet another embodiment of the invention, an SMS message may be initiated in response to a request from a third party technician, for example a mechanic or engineer providing services to the mobile communication unit 110. This embodiment may provide specific information for individual mobile communication units, for example to provide specific information for the installation and repair of components in communication with the mobile communication unit 110. Communication services manager 153 may also provide further requests and determinations based on a reply from mobile communication unit 110. Communication services manager 153 may provide information to mobile communication unit 110 from communication services database 154.

Communication services database 154 may contain records on one or more mobile communication units 110. A portion of communication services database 154 may be dedicated to short message services. Records in communication services database 154 may include vehicle identification, location information, diagnostic information, status information, recent action information, and vehicle passenger (user) and operator (user) defined preset conditions regarding mobile communication unit 110. In one embodiment of the invention, the communication services database 154 may include a mobile communication unit optimized database. The mobile communication unit optimized database can store and retrieve information relating mobile communication units, global positioning system characteristics, and optimal global positioning system mask angle information. Communication services database 154 may provide information and other support to communication services manager 153 and automated speech recognition (ASR) units 157, and in one embodiment of the invention to external services. External services can be for example, vehicle repair services, rental agencies, marketing firms, GPS installation facilities, and additional manufacturers. Another embodiment of the invention may require external services to be authorized, such as having a multi-use license, or pre-approved such as for a one-time use.

Another embodiment of the invention may provide that communication services database 154 include geographic and/or mapping information that may include geographic features such as lakes, mountains, businesses, cities, malls, and any other feature that may be identifiable with a given location. The communication services database 154 may also include points of interest that can be spatially enabled, such as golf courses, rest areas, and historical markers.

Advisor 155 may be a real advisor or a virtual advisor. A real advisor may be a human being in verbal communication with mobile communication device 110. A virtual advisor may be a synthesized voice interface responding to requests from mobile communication device 110. Advisor 155 may provide services to mobile communication device 110. Advisor 155 may communicate with communication services manager 153, automated speech recognition (ASR) units 157, or any other device connected to bus system 156. Another embodiment of the invention may allow for the advisor 155 and ASR units 157 to be integrated as a single unit capable of any features described for either.

Figure 2:
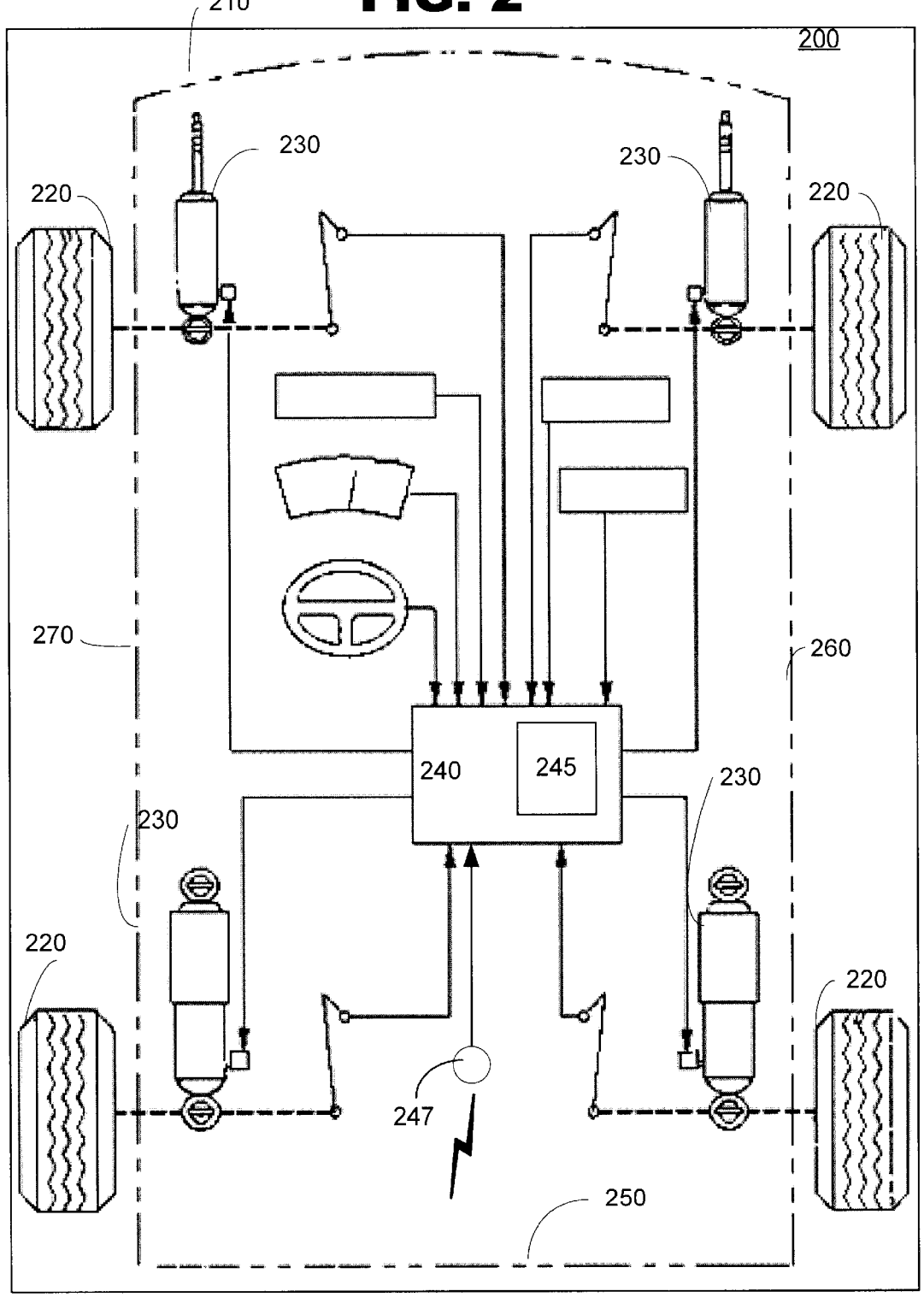
FIG. 2 is a schematic view for one embodiment of an apparatus capable of utilizing the system of FIG. 1, in accordance with the present invention.

Another embodiment of the invention is illustrated in FIG. 2 as an example mobile communication unit, for this embodiment an automobile or vehicle 200. The vehicle 200 may be comprised of a vehicle body supported by four wheels 220 and by four suspension devices 230 including springs (not shown), all of a type known in the art. The vehicle body may be comprised of a front panel 210, rear panel 250, left side panel 270, right side panel 260, hood, trunk, roof, and undercarriage. The vehicle may include a control module 240 that is in communication with a GPS receiver 245 and a GPS antenna 247, as well as various vehicle input output devices and sensors not shown. In an additional embodiment, the GPS receiver may be apart of the control module 240.

Prior to the installation of the GPS receiver 245 and GPS antenna 247, one embodiment of the invention may provide a method for determining the best possible placement for the GPS antenna 247, in order that an optimal mask angle may be provided to the GPS receiver 245. In addition, this embodiment can optimize GPS performance by selecting the appropriate mask angle (optimal mask angle) for individual mobile communication units by using the following method.

Visually inspect the mobile communication unit 200 to determine possible placement locations for the GPS antenna 247.

Characterize the reflective properties of the antenna's environment.

Characterize obstructions in the antenna's environment, which may prevent a clear view of the sky.

Install the GPS antenna 247 at one of the determined placement locations.

Using a set mask angle, test the GPS reception of the GPS receiver 245 for multipath effects.

Vary the mask angle until an optimal mask angle is known.

Insert the optimal mask angle, GPS antenna location, and any additional information into the mobile communication unit optimized database.

Repeat this process until all of the determined possible GPS antenna placement locations have been tested.

Review the data acquired and install the GPS antenna 247 in or on the most appropriate mobile communication unit location, setting the GPS receiver 245 mask angle to the prior determined best angle for the current GPS antenna 247 location.

In another embodiment of the invention, a computer program (software) may be used to set the optimal mask angle value in the GPS receiver 245 during dealer or factory configuration. Additionally, another embodiment of the invention may provide that the mobile communication unit 200 shape be modified to reduce multipath effects, either in conjunction with the other embodiments of the invention, or as a method of its own.

An example installation and test location for the GPS antenna 247 may include the front windshield area of the mobile communication vehicle 200, behind the rearview mirror. The associated testing data may conclude that the GPS receiver 245 will be incapable of tracking satellites below 20 degrees behind the antenna (toward the rear of the vehicle). The GPS receiver 245 will not "know" of this limitation and will attempt to gather range measurements from satellites it can't see. This may significantly increase the amount of time required to achieve a 3-dimensional fix during a cold start. This result may indicate that a minimum mask angle of 20 degrees would be needed for the GPS receiver 245.

Another example installation and test location may include mounting the GPS antenna 247 to the roof of the mobile communication unit 200. In this embodiment there may be little or no obstructions preventing the acquisition of satellite signals at lower elevations. The test data may then indicate that the GPS receiver 245 requires a mask angle of 0 degrees.

In addition to physical obstructions however, other factors may influence the selection of the optimum mask angle. For example, vehicles with large metallic surfaces near the GPS antenna (such as the hood, roof, or panels) may be more vulnerable to low-elevation reflections that reduce positioning accuracy. In another embodiment of the invention, the GPS receiver's mask angle can be optimized to account for these considerations too. Lower mask angles may be preferred for smaller vehicles and when good sky visibility is possible; wherein higher mask angles may be preferred for vehicles with larger reflective surfaces and limited sky visibility.

FIG. 3 is a flow chart representation for one embodiment of a GPS mask angle optimization method 300, utilizing one or more of the systems previously described in accordance with the present invention. The GPS mask angle optimization method 300 may begin 305 by identifying the mobile communication unit using its common name or attributes 310. Example identifications may include an automobiles make and model, an airplanes configuration such as biplane or delta wing, and geometric attributes such as a 2-meter polycarbonate/aluminum cylindrical satellite 5-meters in diameter. Once identified, the mobile communication unit optimized database 320 may be searched for the identified vehicles GPS installation information 315. If the vehicle identification is not found, one embodiment of the invention may determine possible placement locations for the GPS antenna 325. After Installing the GPS antenna at one of the determined placement locations, the physical and electrical characteristics of the mobile communication unit are assessed 330. The assessment may be performed to provide a guideline for determining the appropriate GPS mask angle 335. With the GPS mask angle specified in the GPS receiver, the mobile communication unit may be tested for GPS signal quality, as well as additional test attributes 340. If all determined GPS antenna placement locations have not been tested 345, the process may return to the determining phase 325 to assure that an optimal mask angle result is found from all location data. The completed test data including location information, vehicle ID, and the associated optimal mask angles may be copied and stored 350 in the mobile communication unit optimized database 320. The GPS antenna location may be applied to the identified mobile communication unit 360, and the optimal mask angle applied to the GPS receiver 365, completing the method 370.

In another embodiment of the method 300 stated that the vehicle identification was found 315 with its associated optimal GPS data in the mobile communication unit optimized database 320, then the optimal GPS data may be retrieved 355. The GPS antenna location may next be applied to the identified mobile communication unit 360, and the optimal mask angle applied to the GPS receiver 365, again completing the method 370.

The above-described methods and implementation for GPS mask angle optimization and associated information are example methods and implementations. These methods and implementations illustrate one possible approach for ascertaining a preferred mask angle and its associated information. The actual implementation may vary from the method discussed. Moreover, various other improvements and modifications to this invention may occur to those skilled in the art, and those improvements and modifications will fall within the scope of this invention as set forth below.

The present invention may be embodied in other specific forms without departing from its spirit or essential characteristics. The described embodiments are to be considered in all respects only as illustrative and not restrictive.

We claim:

1. A method for global positioning system mask angle optimization, said method comprising:

reading a first entry of a mobile communication unit optimized database, the first entry indicative of a first optimal mask angle corresponding to a first placement location of a global positioning system antenna on a mobile communication unit;

operationally installing the global positioning system antenna on the first placement location of the mobile communication unit in accordance with the first entry; and applying the first optimal mask angle to a global positioning system receiver in accordance with the first entry.

2. The method of claim 1, further comprising:

experimentally installing the global positioning system antenna on the first placement location;

identifying the first optimal mask angle from among a plurality of optimal mask angles corresponding to the first placement location; and storing the first entry in the mobile communication unit optimized database.

3. The method of claim 2, further comprising:

assessing at least one physical characteristic of the mobile communication unit, wherein the first optimal mask angle is identified as a function of the least one physical characteristic of the mobile communication unit.

4. The method of claim 2, further comprising:

assessing at least one electrical characteristic of the mobile communication unit, wherein the first optimal mask angle is identified as a function of the least one electrical characteristic of the mobile communication unit.

5. The method of claim 2, further comprising:

experimentally installing the global positioning system antenna on a second placement location;

identifying a second optimal mask angle from among a plurality of optimal mask angles corresponding to the second placement location; and storing the second entry in the mobile communication unit optimized database, the second entry indicative of the second optimal mask angle corresponding to the second placement location of the global positioning system antenna on the mobile communication unit.

6. A system for global positioning system mask angle optimization, said system comprising:

means for reading a first entry of a mobile communication unit optimized database, the first entry indicative of a first optimal mask angle corresponding to a first placement location of a global positioning system antenna on a mobile communication unit;

means for instructing an operational installation of the global positioning system antenna on the first placement location of the mobile communication unit in accordance with the first entry; and means for instructing an application of the first optimal mask angle to a global positioning system receiver in accordance with the first entry.

7. The system of claim 6, further comprising:

means for instructing an experimental installation of the global positioning system antenna on the first placement location;

means for identifying the first optimal mask angle from among a plurality of optimal mask angles corresponding to the first placement location; and means for storing the first entry in the mobile communication unit optimized database.

8. The system of claim 7, further comprising:

means for assessing at least one physical characteristic of the mobile communication unit, wherein the first optimal mask angle is identified as a function of the least one physical characteristic of the mobile communication unit.

9. The system of claim 7, further comprising:

means for assessing at least one electrical characteristic of the mobile communication unit, wherein the first optimal mask angle is identified as a function of the least one electrical characteristic of the mobile communication unit.

10. The system of claim 7, further comprising:

means for instructing an experimental installation of the global positioning system antenna on a second placement location;

means for identifying a second optimal mask angle from among a plurality of optimal mask angles corresponding to the second placement location; and means for storing the second entry in the mobile communication unit optimized database, the second entry indicative of the second optimal mask angle corresponding to the second placement location of the global positioning system antenna on the mobile communication unit.

11. A computer readable medium storing a computer program for global positioning computer readable medium mask angle optimization, said computer readable medium comprising:

computer readable code for reading a first entry of a mobile communication unit optimized database, the first entry indicative of a first optimal mask angle corresponding to a first placement location of a global positioning computer readable medium antenna on a mobile communication unit;

computer readable code for instructing an operational installation of the global positioning computer readable medium antenna on the first placement location of the mobile communication unit in accordance with the first entry; and computer readable code for instructing an application of the first optimal mask angle to a global positioning computer readable medium receiver in accordance with the first entry.

12. The computer readable medium of claim 11, further comprising:

computer readable code for instructing an experimental installation of the global positioning computer readable medium antenna on the first placement location;

computer readable code for identifying the first optimal mask angle from among a plurality of optimal mask angles corresponding to the first placement location; and computer readable code for storing the first entry in the mobile communication unit optimized database.

13. The computer readable medium of claim 12, further comprising:

computer readable code for assessing at least one physical characteristic of the mobile communication unit, wherein the first optimal mask angle is identified as a function of the least one physical characteristic of the mobile communication unit.

14. The computer readable medium of claim 12, further comprising:

computer readable code for assessing at least one electrical characteristic of the mobile communication unit, wherein the first optimal mask angle is identified as a function of the least one electrical characteristic of the mobile communication unit.

15. The computer readable medium of claim 12, further comprising:

computer readable code for instructing an experimental installation of the global positioning computer readable medium antenna on a second placement location;

computer readable code for identifying a second optimal mask angle from among a plurality of optimal mask angles corresponding to the second placement location; and computer readable code for storing the second entry in the mobile communication unit optimized database, the second entry indicative of the second optimal mask angle corresponding to the second placement location of the global positioning computer readable medium antenna on the mobile communication unit.

* * * * *